June 10, 1958  M. M. ADAMS  2,838,697
DETONATION METER PICKUP
Original Filed July 25, 1949
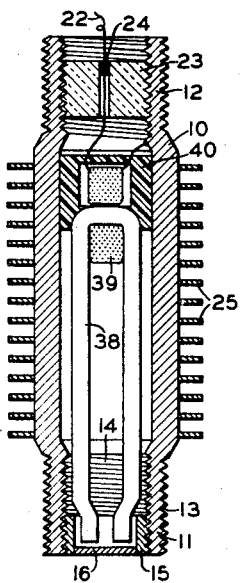
INVENTOR.
M. M. ADAMS
BY
Hudson and Young
ATTORNEYS United States Patent Office 2,838,697
Patented June 10, 1958

2,838,697

DETONATION METER PICKUP

Max M. Adams, Bartlesville, Okla., assignor to Phillips Petroleum Company, a corporation of Delaware Original application July 25, 1949, Serial No. 106,586, now Patent No. 2,641,719, dated June 9, 1953. Divided and this application March 27, 1953, Serial No. 345,038

1 Claim. (Cl. 310—15)

This invention relates to a detonation meter pickup for converting pressure variations in a cylinder of an internal combustion engine to electrical voltages representative thereof.

This application is a division of my copending application Serial No. 106,586, filed July 25, 1949, entitled "Detonation Meter Pickup," now Patent No. 2,641,719, issued June 9, 1953.

Heretofore, in measuring detonation in a cylinder of an internal combustion engine, a pickup of the magnetostrictive type has been utilized to provide electrical voltages respective of the cylinder pressure variations. Such pickups ordinarily comprise a rod of magnetostrictive material having a coil wound thereon, this rod being moved responsive to the pressure variations in the cylinder by a diaphragm attached to the rod, this diaphragm either communicating with the interior of the cylinder or being mounted on the engine block adjacent the cylinder. Magnetostrictive pickups of this type provide a reliable measurement of the cylinder pressure variations by the electrical voltages produced but they have the serious disadvantage that frequent failures occur with resultant expense and inconvenience to the user of the pickup. The most common cause of failure is an open circuit in the coil which is attached directly to the magnetostrictive member and, thus, is subjected to constant mechanical stresses during vibration of the magnetostrictive member.

In accordance with the present invention, the magnetostrictive member is replaced by a magnetic structure operated by the diaphragm which produces a varying magnetic field in the neighborhood of a coil fixed to the casing of the detonation meter pickup. Accordingly, the coil is stationary and is not subject to the mechanical vibrations which necessarily occur in varying the magnetic field in accordance with cylinder pressure variations.

It is an object of the invention to provide an improved detonation meter pickup.

It is a further object to provide a pickup which is not subject to open circuiting of the coil resulting from mechanical stresses due to vibration of the pickup.

It is still a further object to provide a pickup which is reliable in operation and of durable construction.

Various other objects, advantages and features of the invention will become apparent to those skilled in the art from the accompanying disclosure and drawing which is a vertical sectional view of the pickup constructed in accordance with the present invention.

Referring now to the drawing in detail, the pickup comprises a generally cylindrical metal casing 10 which is provided, at its lower end, with a threaded section 11, and, at its upper end, with a threaded section 12. Section 11 has external screw threads 13 which are adapted to fit within a bore in a cylinder of an internal combustion engine so that the lower part of the pickup is in direct communication with the interior of the cylinder under test. Alternatively, section 11 may be provided with a suitable mounting so that it can be attached directly to the engine block and thereby pick up the pressure variations resulting from operation of the engine. The section 11 is also provided with internal threads 14 for receiving an assembly consisting of an externally threaded cylindrical sleeve 15 having a diaphragm 16 secured to its lower end. A permanent magnet 38 is disposed within casing 10 so that the legs thereof extend into closely spaced relationship with diaphragm 16. A coil 39 is wound upon the central region of permanent magnet 38, and assembly including the coil and magnet is supported in fixed position within the casing by a frame 40 of insulating material. One terminal of the coil is connected directly to casing 10 and the other terminal is connected to a lead 22 which extends through a small opening in an annular member 23 which is threaded within section 12 of casing 10. The opening within annular member 23 may be sealed by insulating material 24 to prevent moisture from entering the interior of the casing.

Considerable heat is conducted to the casing 10 during operation of the pickup in testing an internal combustion engine. Accordingly, the casing is provided with a series of longitudinally spaced cooling fins 25 to aid in dissipating the heat conducted to the casing.

Pressure variations within the engine cylinder being tested result in corresponding movement of diaphragm 16. The movements of diaphragm 16 directly change the length of the air gaps between the diaphragm and the legs of the permanent magnet, thus varying the flux density in the region encircled by the coil 39 with the result that a voltage is introduced therein which is representative of the movement of the diaphragm 16.

Where the pickup is of the external type which is mounted directly on the outside of the engine block, as described in U. S. Patent 2,445,318, diaphragm 16 may be replaced by a metal stud secured to the casing 13 with its outer end screwed into the wall of the block. The legs of magnet 38 are then closely spaced to the inner end of this stud. Pressure changes in the cylinder produce relative movement between the coil and the magnet structure, thereby inducing a voltage representative of such pressure changes in the coil.

Due to the use of the stationary coil in the present invention, a much longer life results than can be expected from magnetostrictive type pickups. This results from the fact that the coil is not subjected to the extremely rapid and complex vibrations of the diaphragm but only to the relatively small amplitude vibrations of the casing. Hence, open circuiting of the coil occurs with far less frequency.

In addition, the physical positioning of the coil away from the diaphragm permits much cooler operation of the coil with the attendant benefit to the insulation and lacquer employed in coil manufacture.

While the invention has been described in connection with a present, preferred embodiment thereof, it is to be understood that this description is illustrative only and is not intended to limit the invention.

I claim:

A detonation meter comprising an elongated casing having a plurality of longitudinally spaced fins mounted on the exterior thereof to dissipate heat, the outer surface of one end of said casing being threaded so that the casing can be screwed into a cylinder of an internal combustion engine, a sleeve threaded into said casing at said one end, a diaphragm of magnetic material secured to said sleeve and extending across said one end of said casing, a U-shaped permanent magnet, a support of insulating material mounted within said casing adjacent the second end thereof, said support being the sole support of said magnet and mounting said magnet so that an air gap exists between said casing and the major portion of said magnet and so that the ends of the legs of said magnet extend into closely spaced relationship with said diaphragm, a coil of wire enclosing the center portion of said magnet so that movement of said diaphragm changes the spacing between said diaphragm and the legs of said magnet to induce current in said coil representative of movement of said diaphragm, an insulating plug positioned within the second end of said casing, and at least one conductor extending through plug to said coil.

References Cited in the file of this patent

UNITED STATES PATENTS

| | | |
|---|---|---|
| 1,213,804 | Cahill | Jan. 23, 1917 |
| 1,537,930 | Lichte | May 12, 1925 |
| 1,563,626 | Hecht | Dec. 1, 1925 |
| 1,718,494 | Schurig | June 25, 1929 |
| 2,269,760 | Eldredge | Jan. 13, 1942 |
| 2,319,219 | Draper | May 18, 1943 |
| 2,396,703 | Kamler et al. | Mar. 19, 1946 |
| 2,414,457 | Eldredge et al. | Jan. 21, 1947 |
| 2,641,719 | Adams | June 9, 1953 |